United States Patent Office 3,080,391
Patented Mar. 5, 1963

3,080,391
6α-CHLORO-Δ¹,⁴-ANDROSTADIEN-17β-OL-3-ONE DERIVATIVES
Howard J. Ringold, Octavio Mancera, and Albert Bowers, Mexico City, Mexico, assignors, by mesne assignments, to Syntex Corporation, a corporation of Panama
No Drawing. Filed Feb. 19, 1959, Ser. No. 794,242
Claims priority, application Mexico Feb. 25, 1958
2 Claims. (Cl. 260—397.4)

The present invention relates to cyclopentanophenanthrene compounds.

More particularly the present invention relates to novel steroidal 6α-chloro-Δ¹,⁴-androstadien-17β-ol-3-one derivatives having a lower alkyl, lower alkenyl or lower alkinyl substituent at C–17 as well as to esters thereof. The novel compounds of the present invention just described and to be hereinafter described in detail are active progestational hormones. The present invention also relates to novel 6α-chloro-Δ⁴-androsten-17β-ol-3-one derivatives having a 17α-lower alkenyl substituent. These last compounds are intermediates for the production of the corresponding 1-dehydro compounds and are also progestational hormones.

In accordance with the present invention the novel Δ¹,⁴-derivatives were obtained by dehydrogenating the corresponding Δ⁴-derivatives and the novel Δ⁴-17α-lower alkenyl compounds were obtained by partial hydrogenation of the corresponding 17α-lower alkinyl compounds.

The novel compounds of the present invention are illustrated by the following formulas:

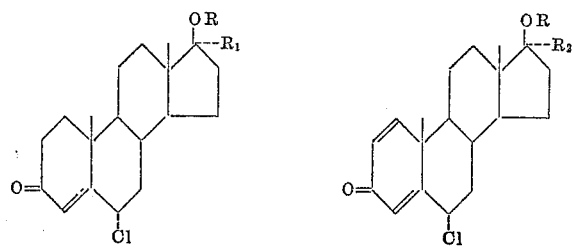

In the above formulas R represents hydrogen or a hydrocarbon carboxylic acyl group of up to 12 carbon atoms. This acyl group may be saturated or unsaturated of straight or branched chain, cyclic or mixed cyclic-aliphatic and may be conventionally substituted as by methoxy, halogen etc. Typical acyl group are acetate, propionate, butyrate, hemisuccinate, enanthate, caproate, benzoate, trimethylacetate, phenoxyacetate, cyclopentylpropionate, phenylpropionate or β-chloropropionate. $R_1$ represents a lower alkenyl group of up to 6 carbon atoms such as vinyl, propenyl, or butenyl. $R_2$ represents a lower alkyl of up to 6 carbon atoms such as methyl, ethyl or propyl, or a lower alkenyl of up to 6 carbon atoms such as vinyl, propenyl or butenyl, or a lower alkinyl of up to 6 carbon atoms such as ethinyl, propinyl or butinyl.

The compounds above set forth are prepared by a process illustrated in the following equations:

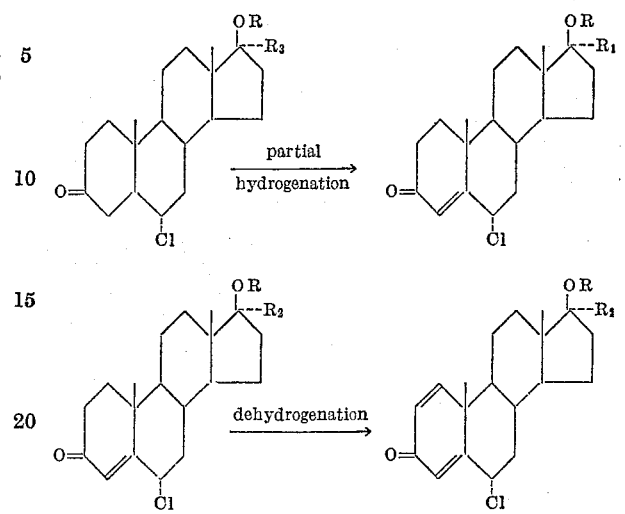

In the above equations R, $R_1$ and $R_2$ represent the same groups as heretofore. $R_3$ represents lower alkinyl of up to 6 carbon atoms such as ethinyl, propinyl or butinyl.

In practicing the process illustrated in the first equation a 17α-lower alkinyl-6α-chloro-testosterone compound was dissolved in an organic solvent and treated with hydrogen in the presence of a hydrogenation catalyst, preferably a palladium catalyst, until one mol of hydrogen was absorbed. The product compound was then conventionally separated and purified.

The dehydrogenation of the second equation may be carried out by microbiological methods known in steroid chemistry or by chemical means. Preferably the dehydrogenation was carried out by refluxing the starting compounds with selenium dioxide in admixture with t-butanol, in the presence of a catalystic amount of pyridine for a long period of time. Upon conventional separation and purification there was obtained the corresponding Δ¹,⁴-compounds.

The following specific examples serve to illustrate but are not intended to limit the present invention.

In the following specific examples the starting compounds of Examples IV to VIII were prepared in accordance with U.S. patent application Serial No. 776,694, filed November 28, 1958, now abandoned.

*Example I*

A suspension of 750 mg. of 10% palladium on calcium carbonate catalyst in 100 cc. of pure pyridine was stirred under an atmosphere of hydrogen for 2 hours at a temperature of 25° C. and at atmospheric pressure. There was then added 3 g. of 17α-ethinyl-6α-chloro-testosterone and the hydrogenation was continued under the same conditions until the equivalent of one mol of hydrogen had been absorbed. The catalyst was removed by filtration, washing the filter with a little pyridine, and the filtrate and washings were combined. The pyridine was removed under reduced pressure and the residue was crystallized from a mixture acetone-hexane. There was thus obtained 17α-vinyl-6α-chloro-testosterone.

Example II

In the method of the previous example there was substituted for the 17α-ethinyl-6α-chloro-testosterone a C-17 ester of the latter, formed with a hydrocarbon carboxylic acid radical of up to 12 carbon atoms, thus giving rise to the formation of the corresponding 17-ester of 17α-vinyl-6α-chloro-testosterone. Specifically in this way there was prepared the acetate, propionate, cyclopentylpropionate and benzoate.

Example III

Substituting in the methods of the previous examples, for the 17α-ethinyl-6α-chloro-testosterone or its ester, another 17α-alkinyl-6α-chloro-testosterone or an ester of the same, there were obtained the corresponding 17α-alkenyl-6α-chloro-testosterones or the esters of the same. For example, starting from 17α-butinyl-6α-chloro-testosterone there was prepared 17α-butenyl-6α-chlorotestosterone, and from the propionate of 17α-propinyl-6α-chlorotestosterone there was obtained the propionate of 17α-propenyl-6α-chloro-testosterone.

Example IV

A mixture of 2 g. of 17α-methyl-6α-chloro-testosterone, 100 cc. of t-butanol, 0.8 g. of selenium dioxide and 0.5 cc. of pyridine was refluxed under an atmosphere of nitrogen for 72 hours; the mixture was cooled, filtered through celite, washing the filter with hot t-butanol, and the combined filtrate and washings was evaporated to dryness under reduced pressure. The residue was dissolved in acetone, treated with decolorizing charcoal and the solution was dried over anhydrous sodium sulfate and evaporated to dryness. Chromatographic purification of the residue on neutral alumina yielded 17α-methyl-6α-chloro-$\Delta^{1,4}$-androstadien-17β-ol-3-one.

Example V

By the method of the previous example, 17α-ethinyl-6α-chloro-testosterone was converted into 17α-ethinyl-6α-chloro-$\Delta^{1,4}$-androstadien-17β-ol-3-one.

Example VI

By the method of Example IV, 17α-vinyl-6α-chloro-testosterone was converted into 17α-vinyl-6α-chloro-$\Delta^{1,4}$-androstadien-17β-ol-3-one.

Example VII

Following the method of Example III there were also prepared from the corresponding $\Delta^4$-compounds other free 17α-lower alkyl, 17α-lower alkenyl and 17α-lower alkinyl derivatives of 6α-chloro testosterone as well as the corresponding esters of hydrocarbon carboxylic acids of up to 12 carbon atoms. These included specifically the acetate, propionate, cyclopentylpropionate and benzoate of 17α-methyl, ethyl, propyl, vinyl, propenyl, butenyl, ethinyl propinyl and butinyl derivatives of 6α-chloro-$\Delta^{1,4}$-androstadien-17β-ol-3-one and the free compounds.

We claim:

1. 6α-chloro-17α-lower alkenyl-$\Delta^{1,4}$-androstadien-17β-ol-3-one.

2. The hydrocarbon carboxylic acid esters of up to 12 carbon atoms of 6α-chloro-17α-lower alkenyl-$\Delta^{1,4}$-androstadien-17β-ol-3-one.

References Cited in the file of this patent

UNITED STATES PATENTS

| | | |
|---|---|---|
| 2,085,474 | Ruzicka | June 29, 1937 |
| 2,837,464 | Nobile | June 3, 1958 |
| 2,838,490 | Babcock et al. | June 10, 1958 |
| 2,838,500 | Campbell et al. | June 10, 1958 |